May 1, 1928.

P. W. GATES 1,667,849

LUBRICATOR

Filed Feb. 9, 1927

Inventor
Philetus W. Gates.
Emery Booth Janney & Varney
Attys.

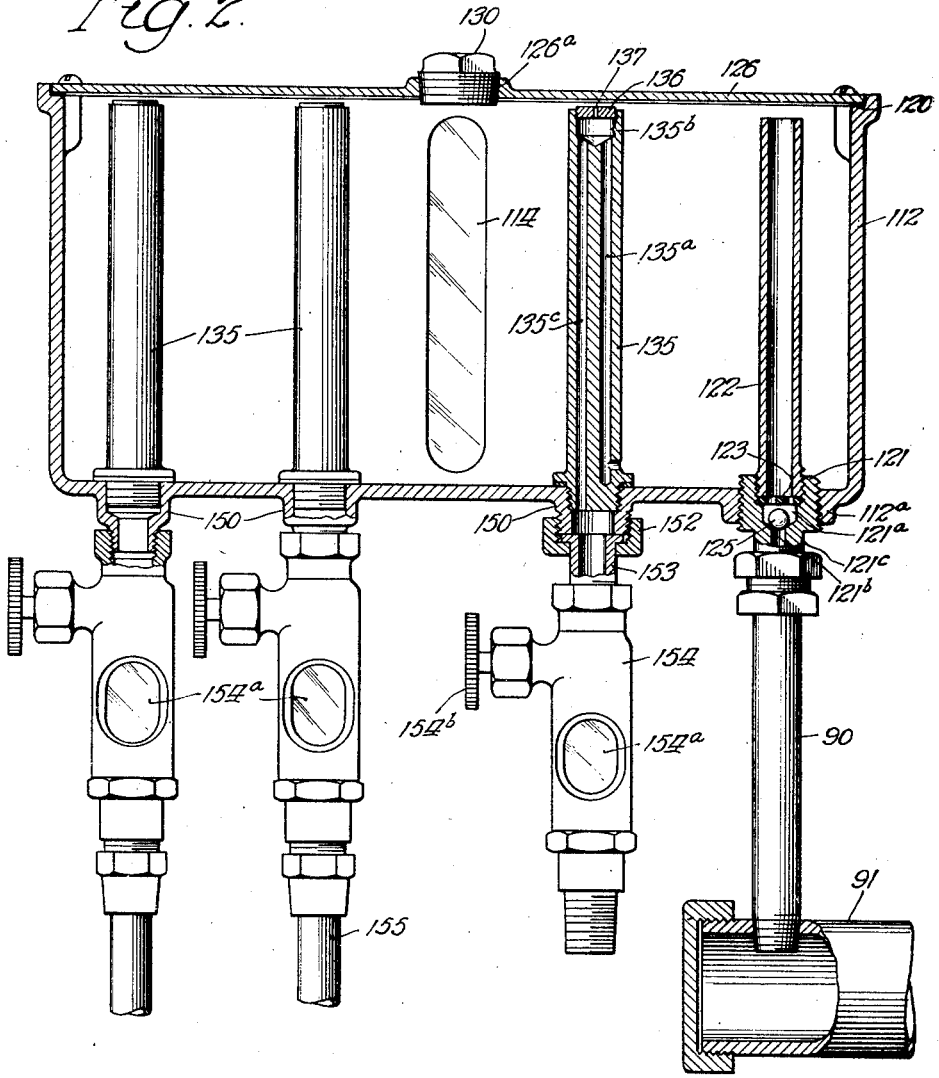

Patented May 1, 1928.

UNITED STATES PATENT OFFICE.

PHILETUS W. GATES, OF CHICAGO, ILLINOIS, ASSIGNOR TO HANNA ENGINEERING WORKS, OF CHICAGO, ILLINOIS, A CORPORATION OF ILLINOIS.

LUBRICATOR.

Application filed February 9, 1927. Serial No. 166,826.

This invention relates to improvements in lubricators and is a continuation in part of my prior applications, Serial Nos. 539,337, filed February 27, 1922, issued as Letters Patent 1,620,253, March 8, 1927, and 664,408, filed September 24, 1923, which is being abandoned in view of the transfer of its disclosure and claims to this application.

Among the objects of my invention are to provide a lubricator which may be attached to a fluid pressure line or the like, with either constant or cyclic pressure, which pressure will operate to expel lubricant at the desired rate into the line to lubricate the mechanism actuated by the fluid pressure or other contacting surfaces; to provide such a lubricator in which the pressure in the lubricator from the line or the like will be readily relieved upon cessation of actuation; to provide such a lubricator in which expulsion of the oil therefrom is prevented except under pressure and in which means is provided to prevent the establishment of a siphon after the cessation of supply of actuating fluid under pressure. These and other objects will be more fully described and set forth in the following specification and illustrated in the accompanying drawings in which—

Fig. 2 is a vertical section through another embodiment of my invention illustrating the same as a multiduct device, capable of use with either fluctuating or constant pressure line, portions of the device being shown in elevation.

Figure 1:
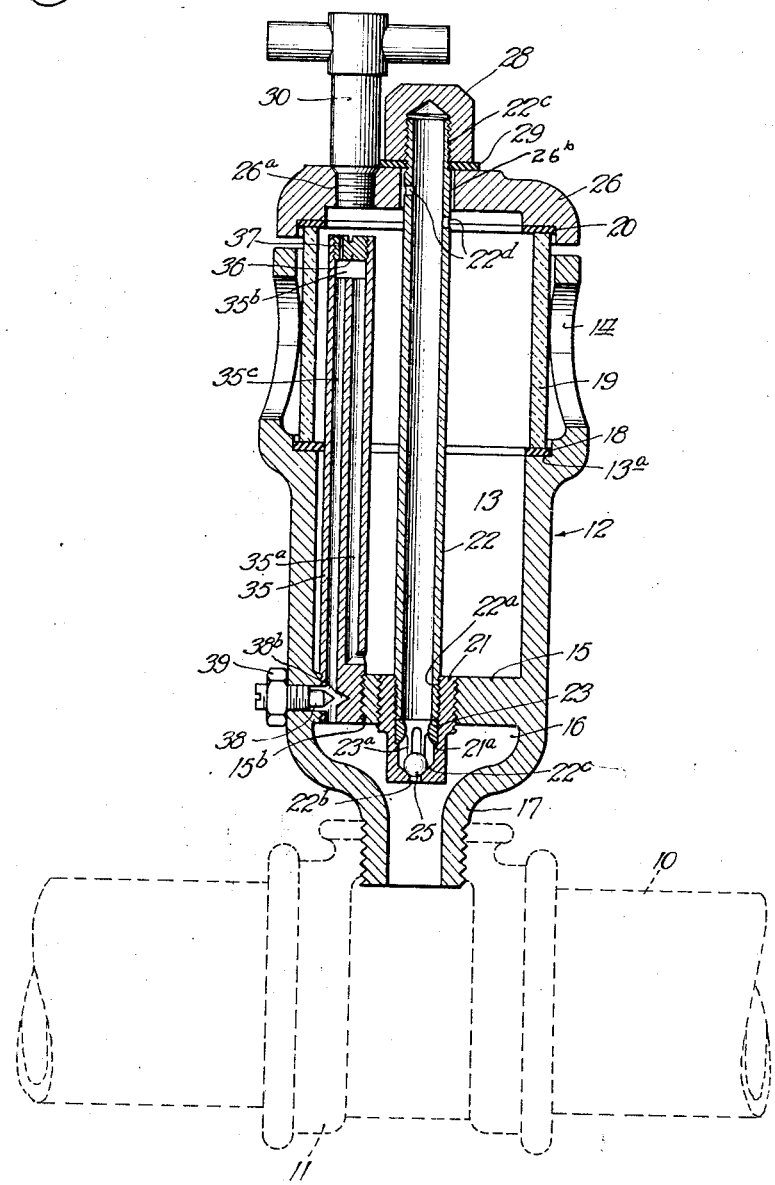
Fig. 1 is a vertical section through one embodiment of my lubricator, the intermittent or cyclic pressure line being illustrated in dotted lines.

Like numerals refer to like elements throughout the drawings in which 10 illustrates in dotted lines a fluid pressure line including a threaded T 11 in the stem of which is threaded the lubricator generally indicated by numeral 12.

The lubricator is constructed of cylindrical or other form, and is provided with a lubricant reservoir or chamber 13, having a shoulder $13^a$ and provided with sight openings 14. A partition 15 is located at the bottom of the lubricant reservoir and beneath the partition is provided a chamber 16, the lubricator being formed with a threaded neck 17, centrally apertured to form a continuation of chamber 16. This neck is threaded into the T 11 in the arrangement shown, although it is obvious that it may be attached to any pressure line or the like as desired.

Seated on the shoulder $13^a$ is a packing washer 18 on which in turn is superimposed the glass cylinder 19. A second packing washer is carried at the top of the cylinder 19. Partition 15 is provided with the threaded aperture in which is screwed the plug 21, in turn apertured and threaded for engagement by the threaded extremity $22^a$ of the vertical tube 22. The aperture of the plug 21 is narrowed or reduced at its lower end to form the shoulder $21^a$, upon which seats a collar 23, apertured and provided with inwardly projecting restraining fingers $23^a$. Located beneath the collar 23 is the ball 25, capable of limited movement and restrained in its vertical movement by the fingers $23^a$ of collar 23. An inlet port $22^b$, of reduced diameter, is provided in the lower end of plug 21, which is further provided with a seat $22^c$ for the ball 25, this construction providing a ball check which will permit flow of pressure fluid into the tube but prevent its return. In its upper portion the tube 22 is provided with ports $22^d$ leading to the interior of the reservoir or chamber 13. A cap 26 rests upon the washer 20, and is suitably apertured at $26^b$ for protrusion of the upper portion of the tube 22 and to provide clearance thereabout, the tube 22 being threaded at $22^e$ and engaged by the nut 28, a packing ring 29 being located between the nut 28 and cap 26.

It will be apparent that when nut 28 is screwed down, the cap 26 will bring the glass cylinder 19 into close contact with the packing washers 18 and 20, and will further serve to compress the packing ring 29 against the cap 26, thus making an air-tight construction. Filler opening $26^a$ is provided in the cap 26 and is normally closed by the threaded plug 30.

A second threaded aperture $15^b$ is provided in the partition 15 and in this aperture is threaded the rod 35, which is provided with a longitudinally arranged duct $35^a$ opening at its lower end into the lower portion of the lubricant chamber 13 and at its upper end into a recess $35^b$ in the rod. A second parallel duct $35^c$ is provided in the rod 35 and leads from the recess $35^b$ downwardly to communication with the chamber 16. These two ducts 35ª and 35ᶜ, in conjunction with recess 35ᵇ, form a looped duct in effect. Recess 35ᵇ is closed by the threaded plug 36, which is provided with a small bleed duct 37, furnishing restricted communication between recess 35ᵇ and the upper portion of the lubricant chamber 13. Extending into the lower portion of the duct 35ᶜ is the adjusting valve 38 having a conical tip coacting with the valve seat 38ᵇ to permit adjustment of the flow of lubricant from duct 35ᶜ into chamber 16. This valve 38 may be adjusted as stated and locked in adjusted position by means of the lock nut 39.

In the use of my improved lubricator while the same is attached to a fluid pressure line in the manner indicated, as the pressure in the line reaches maximum in its cycle this pressure will obtain in the upper portion of the lubricant chamber 13 above the surface of the lubricant. As the pressure drops in the line the ball 25 will be seated and prevent flow of the fluid back into the line through tube 22. The pressure of the entrapped fluid, being greater than that obtaining in the line, will force the lubricant up through duct 35ª into recess 35ᵇ, downwardly through duct 35ᶜ and into the chamber 16, from whence it will flow into the line and be picked up by the pressure fluid and carried to the mechanism which is being actuated. As the pressure in the line again approaches maximum it exceeds that of the fluid entrapped in the reservoir and ball check 25 will open and permit rise of pressure in the chamber to maximum. It will thus be apparent that there is an intermittent supply or discharge of lubricant when the pressure in the line is less than that obtaining in the reservoir, and by properly adjusting valve 38 the desired amount of lubricant may thus be discharged into the pressure line and conveyed with the fluid under pressure to the contacting surfaces of the functioning mechanism to ensure lubrication.

Where the lubricator is inserted in the line between the shut-off cock and the actuating mechanism, as it should be, it will be apparent that shutting off the fluid pressure would bring the pressure in the line at the lubricator to atmospheric pressure, and the entrapped pressure in the lubricator would continue to force oil into the line, resulting in draining of the lubricator and an accumulation of an undesirable amount of lubricant in comminuted condition in the line. The provision of the bleed duct 37 prevents this, as when the pressure is cut off in the manner described, this bleed passage will permit the entrapped fluid to break the oil flow through the rod 35 and such entrapped fluid will discharge into the line and exhaust. This not only relieves the pressure in the lubricator, but prevents the establishment of a siphon or partial siphon which might drain out the oil from the lubricator into the line even with balanced pressure in the lubricator and the line. This bleed passage is of such size that it will not appreciably affect the functioning of the lubricator during use of the pressure line, in fact, it is believed so far as it can be observed, that it assists in the comminution or breaking up of the oil discharged into the line, which is desirable for good lubrication. If the lubricator be inserted in the line between the source of pressure and the shut-off cock, it will be apparent that when the supply to the actuating mechanism is cut off by closing such cock, the pressure would balance between the line and chamber which would preclude discharge of the lubricant under pressure, but would not prevent the formation of a siphon, and again the bleed passage 37 will serve to break up or prevent the formation of any such siphon.

In Fig. 2 I have illustrated another embodiment of my invention of a multi-duct type. This comprises a reservoir 112 having the cover 126 securely screwed or otherwise made fast to the reservoir, a gasket 120 being interposed to prevent leakage of air. A filler opening 126ª is provided with the closure plug 130. One or more windows 114 are provided in the reservoir to permit observation of the oil content, these being closed by glass or the like, suitably sealed to prevent leakage.

The bottom of the reservoir 112 is provided with a threaded apertured boss 112ª in which is threaded the tapered plug 121, it being centrally apertured and threaded to receive the threaded end of tube 122. Plug 121 is provided with a small chamber 121ª in which may be mounted a ball check 125, the same being adapted in its normal position to close the inlet port 121ᵇ. Above the ball check 125 is the apertured disk 123 held in position by the tube 122 in such wise as to permit limited movement of the ball check 125. Secured to the plug 121, which is provided with the reduced stem 121ᶜ for that purpose, is the tube 90, which in turn is threaded into the stub end 91 of the pressure line. Other bosses 150 are provided at the under side of the reservoir 112, suitably apertured and internally threaded to be engaged by the upwardly extending rods 135, which are provided with the vertical ducts 135ª in communication at their lower ends with the interior of the reservoir. At the upper end of each rod 135 is a chamber 135ᵇ closed by the plug 136, which in turn is provided with the bleed passage 137. Leading downwardly from the chamber 135 is the duct 135ᶜ parallel to duct 135ª. This latter duct leads to the interior of boss 150. Threaded upon each boss 150 is the fastening collar 152 which engages and supports the needle 153 upon which in turn is threaded coupling 154, each of these couplings being provided with a sight window 154$^a$ and a regulating needle valve 154$^b$ in well known manner. To these couplings 154 may be attached the lubricating ducts 155 leading to any desired location requiring lubrication. One of these may be extended and connected to the pressure line itself as in the case of the embodiment shown in Fig. 1, if the pressure is intermittent or cyclic.

When the form illustrated in Fig. 2 is utilized with a cyclic pressure line the function is substantially similar to that described in connection with the form of Fig. 1, the entrapped fluid pressure being utilized to expel the lubricant through all of the ducts, the flow therethrough being controlled by needle valves 154$^b$. When the line pressure is cut off the entrapped fluid will discharge through the bleed passage 137 and the formation of siphons prevented, the pressure being relieved in a relatively short period of time.

The form illustrated in Fig. 2 may be utilized with a continuous pressure line if so desired, in which event the ball check 125 may be omitted or not as desired, since it is not required in such operation.

In Fig. 2 I have illustrated the pressure supply as connected to the stub end 91 of a constant pressure system, and it will be apparent that when the supply of actuating fluid is shut off, pressure may obtain in this stub 91 and likewise in the lubricator 112, in which event the bleed passages 137 will permit relief of such pressure in the manner previously described, and substantially prevent discharge of oil from the lubricator.

It will be apparent that my invention is susceptible of modification, and I do not wish to be restricted to the form shown and described, save as defined in the appended claims.

What I claim is:

1. In combination with an actuating fluid line, a lubricator comprising a lubricant reservoir, a lubricant duct leading from said reservoir to said line, a second duct in communication with said reservoir and said line, means coacting with said second duct to permit the flow of actuating fluid to said reservoir under pressure from said line and to prevent return of such fluid, said lubricant duct beng constructed with a portion thereof located above the lubricant level of said reservoir, and a bleed duct extending between said portion and the upper portion of said lubricant reservoir.

2. In a device of the class described, a body portion having a lubricant reservoir and a passage for actuating fluid, a partition separating said reservoir and said passage, a duct leading from said passage to said reservoir, means associated therewith to permit the flow of the actuating fluid under pressure into said reservoir and to prevent its escape therefrom, a rod extending into said reservoir from said partition and provided with a looped duct leading from below the lubricant level of said reservoir into said passage, said rod being provided with a bleed duct leading from the upper portion of said looped duct to the upper portion of said reservoir.

3. In a device of the class described, a body portion having a lubricant reservoir and an inlet passage for actuating fluid, a check valve to permit entrance of said actuating fluid and prevent its return through said passage, a duct leading from said reservoir to a pressure line or the like, said duct being provided with a portion intermediate its extremities located above the lubricant level and a bleed duct communicating with said intermediate portion and the upper portion of said reservoir.

4. In a device of the class described, a body portion having a lubricant reservoir, a passage for actuating fluid, means coacting with said passage to permit entrance of said actuating fluid and to prevent its return, a rod extending into said lubricant chamber and having a looped duct therein, said rod being provided with a recess adjacent its upper portion and comprising a part of said duct, and a bleed duct extending between said recess and the upper portion of said lubricant chamber.

5. In a device of the class described, a body portion having a lubricant reservoir and an inlet passage for actuating fluid, a duct leading from said reservoir to convey lubricant to a desired location, said duct being provided with a portion intermediate its extremities located above the lubricant level and a bleed duct communicating with said intermediate portion and the upper portion of said reservoir.

6. A lubricator comprising a reservoir and having an inlet passage for actuating fluid, a plurality of ducts leading from said reservoir to points to which lubricant is to be supplied, each of said ducts being provided with a portion intermediate its extremities located above the lubricant level and a bleed duct communicating with said intermediate portion and the upper portion of said reservoir.

In testimony whereof, I have signed my name to this specification.

PHILETUS W. GATES.